United States Patent
Yousef et al.

(10) Patent No.: US 9,886,842 B2
(45) Date of Patent: Feb. 6, 2018

(54) WEARABLE DEVICE AND METHOD FOR PROVIDING MESSAGE OF WEARABLE DEVICE

(71) Applicant: Samsung Electronics Co., Ltd., Suwon-si, Gyeonggi-do (KR)

(72) Inventors: Kharsim Yousef, Seoul (KR); Sung-wook Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/555,944

(22) Filed: Nov. 28, 2014

(65) Prior Publication Data

US 2015/0154853 A1   Jun. 4, 2015

(30) Foreign Application Priority Data

Dec. 4, 2013 (KR) .................. 10-2013-0150167

(51) Int. Cl.
| | | |
|---|---|---|
| *G08B 1/08* | (2006.01) | |
| *G08B 25/10* | (2006.01) | |
| *G06F 3/01* | (2006.01) | |
| *H04M 19/04* | (2006.01) | |

(52) U.S. Cl.
CPC .............. *G08B 25/10* (2013.01); *G06F 3/011* (2013.01); *G06F 3/016* (2013.01); *H04M 19/047* (2013.01)

(58) Field of Classification Search
CPC ........... G08B 25/10; G08B 6/00; G06F 3/016; H04M 19/047

USPC ........................ 340/539.11, 407.1, 407.2, 7.6
See application file for complete search history.

(56) References Cited

U.S. PATENT DOCUMENTS

| | | | |
|---|---|---|---|
| 5,282,181 A * | 1/1994 | Entner | G04B 25/04 368/230 |
| 5,293,161 A | 3/1994 | MacDonald et al. | |
| 6,028,531 A | 2/2000 | Wanderlich | |
| 6,218,958 B1 * | 4/2001 | Eichstaedt | G08B 6/00 340/4.12 |
| 6,359,550 B1 * | 3/2002 | Brisebois | H04M 19/04 340/311.2 |
| 7,243,824 B2 | 7/2007 | Tabata | |
| 8,344,862 B1 | 1/2013 | Donham | |
| 8,712,383 B1 * | 4/2014 | Hayes | H04M 19/047 455/404.1 |
| 2012/0218091 A1 * | 8/2012 | Rothschild | G08B 6/00 340/407.1 |
| 2013/0115579 A1 | 5/2013 | Taghavi | |
| 2014/0180582 A1 * | 6/2014 | Pontarelli | G08B 6/00 701/494 |

FOREIGN PATENT DOCUMENTS

| | | |
|---|---|---|
| WO | 91/20136 A1 | 12/1991 |
| WO | 2011/119233 A1 | 9/2011 |

\* cited by examiner

*Primary Examiner* — Toan N Pham
(74) *Attorney, Agent, or Firm* — Jefferson IP Law, LLP

(57) ABSTRACT

A wearable device is provided. The device includes a stimulus generator configured to transmit a stimulus to a user's body when the wearable device is worn on the user's body, and a controller configured to control the stimulus generator to vary a transfer pattern of the stimulus according to an operation state of the wearable device.

18 Claims, 22 Drawing Sheets

FIG. 5
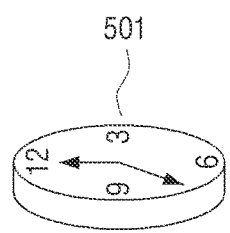
501
Watchface
Display Mechanism
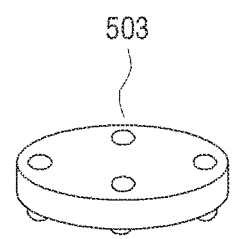
503
Example WatchBack
Notification Mechanism
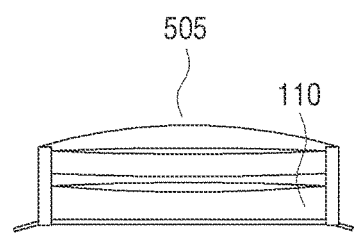
505
110
Assembled Watchback
Mechanism

WEARABLE DEVICE AND METHOD FOR PROVIDING MESSAGE OF WEARABLE DEVICE

CROSS-REFERENCE TO RELATED APPLICATION(S)

This application claims the benefit under 35 U.S.C. §119(a) of a Korean patent application filed on Dec. 4, 2013 in the Korean Intellectual Property Office and assigned Serial number 10-2013-0150167, the entire disclosure of which is hereby incorporated by reference.

TECHNICAL FIELD

The present disclosure relates to a wearable device. More particularly, the present disclosure relates to a wearable device wearable on a user's body, for generating a stimulus according to an operation state of the device, and a method for providing a message of the wearable device.

BACKGROUND

Currently, devices wearable by the user's body while performing as various smart functions have been developed. Representative examples of the wearable devices may include a smart watch, a smart glass, and the like. The smart watch is wearable on the wrist like a traditional analog or digital watch and provides various functions for making a call like a cellular phone, sending text messages or email, web surfing, and the like. The smart glass provides various smart functions such as photographing an object or viewing an image while being worn on the user's body like traditional eyeglasses.

In this case, the wearable device is worn on a part of the user's body and thus partially contacts the user's body. A general device needs to generate a sound or display specific information on a display in order to indicate an operation state. However, the wearable device has the feature whereby the device contacts the user's body and thus has another method for indicating an operation state to a user. That is, a stimulus is given to a user's body to indicate an operation state of the device to the user. The method for giving a stimulus to the user's body to indicate an operation state of the device to the user may be very useful because a simple operation of the device to a complex state of the device is indicated to the user. Thus, a method for giving a stimulus to a user is important. In this case, there is a need for an appropriate method for designing a wearable device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a wearable device that gives a stimulus to a user according to an operation of the wearable device to indicate the operation state of the wearable device to release user's sight or auditory from the device.

Another aspect of the present disclosure is to provide a wearable device and a method for providing a message of a wearable device, in which the wearable device generates various types of stimuli to transfer various indication messages to the user.

In accordance with an aspect of the present disclosure, a wearable device is provided. The wearable device includes a stimulus generator configured to transmit a stimulus to a user's body when the wearable device is worn on the user's body, and a controller configured to control the stimulus generator to vary a transfer pattern of the stimulus according to an operation state of the wearable device.

The stimulus generator may include at least one vibration type actuator.

The stimulus generator may further include a plurality of vibration type actuators, and the controller may independently control the plural vibration type actuators according to the operation state of the wearable device.

The controller may sequentially vibrate the plural vibration actuators to form any one shape a circle, an oval, a line, a rectangle, and a dotted shape.

The controller may control the stimulus generator to transmit a patterned stimulus at a predetermined time interval when a predetermined event occurs in the wearable device.

The controller may control the stimulus generator to transmit a first pattern of stimulus indicating telephone reception, a second pattern of stimulus indicating the person at the other end, and a third pattern of stimulus indicating the characteristics of call when the wearable device receives a call.

The controller may control the stimulus generator to transmit a first pattern of stimulus indicating message reception, a second pattern of stimulus indicating message importance, and a third pattern of stimulus indicating message characteristics when the wearable device receives a call.

The wearable device may further include a display, wherein the controller may control the display to also display information according to the operation state of the wearable device.

The stimulus generator may be disposed to a surface of the wearable device, which contacts the human body.

The wearable device may communicate with at least one external terminal.

The wearable device may be a smart watch.

The stimulus generator may include any one of a pressure generator, an electrical stimulus generator, a touch generator, and a temperature stimulus generator.

The wearable device may further include a band, a shape of which is modified according to the operation state of the wearable device.

The controller may control the band to be tightened when an event occurs.

The wearable device may further include a band for allowing the wearable device to be worn on a user body, and a winder for automatically winding a portion of the band when the wearable device is worn one the human body.

The winder may include a rotation motor, and the controller may control the winder to stop the rotation motor when a portion of the band is continuously wound until rotation count of the rotation motor increases and then rotation count is stopped.

The wearable device may further include a band for allowing the wearable device to be worn on a user body, and a wearing state display configured to display an operation state of the band.

The operation state display may include a plurality of lamps.

In accordance with another aspect of the present disclosure, a method for providing a message of a wearable device is provided. The method includes determining a transfer pattern of a stimulus according to a type of an event when the event occurs, and generating a stimulus according to the determined transfer pattern of stimulus and transmitting the stimulus to a user's body.

The generating may be performed by at least one vibration type of actuator.

The generating may include sequentially vibrating the plural vibration actuators to form any one shape a circle, an oval, a line, a rectangle, and a dotted shape.

The generating may include transmitting a patterned stimulus at a predetermined time interval when a predetermined event occurs in the wearable device.

In accordance with another aspect of the present disclosure, a method for providing a message of a wearable device includes determining a transfer pattern of a stimulus according to a type of an event when an event corresponding to a telephone reception occurs. In this case, a first pattern of stimulus indicating telephone reception, a second pattern of stimulus indicating the person at the other end, and a third pattern of stimulus indicating the characteristics of call may be transmitted to the human body.

In accordance with another aspect of the present disclosure, a method for providing a message of a wearable device includes determining a transfer pattern of a stimulus according to a type of an event when an event corresponding to message reception occurs. In this case, a first pattern of stimulus indicating message reception, a second pattern of stimulus indicating message importance, and a third pattern of stimulus indicating message characteristics may be transmitted to the human body.

The method may further include displaying information about the operation state of the wearable device.

The generating may be performed by any one of a pressure generator, an electrical stimulus generator, a touch generator, and a temperature stimulus generator.

According to the aforementioned various embodiments of the present disclosure, a stimulus is given according to an operation state of a wearable device to indicate the operation state of the wearable device to release user's sight or auditory from the device.

An embodiment of the present disclosure provides a wearable device that generates various types of stimuli to transfer various indication messages to the user.

In addition, a multi-level pattern stimulus may be generated, and a multi-level indication message about the wearable device may be transmitted to the user.

In addition, a generator for generating various patterns of stimuli of the wearable device is not limited and may include various examples.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 5 is a diagram illustrating concept indicating that various types of stimulus generators are coupled to a lower end portion of a smart watch according to various embodiments of the present disclosure;

The same reference numerals are used to represent the same elements throughout the drawings.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
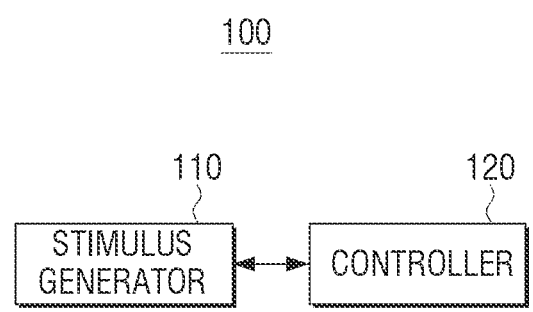
FIG. 1 is a block diagram of a wearable device 100 according to an embodiment of the present disclosure.

FIG. 1 is a block diagram of a wearable device according to an embodiment of the present disclosure.

Referring to FIG. 1, a wearable device 100 according to an embodiment of the present disclosure includes a stimulus generator 110 and a controller 120.

The stimulus generator 110 is a component for transmitting a stimulus to a user's body when the wearable device 100 is worn on the user's body. The stimulus generator 110 may include at least one vibration type actuator. In detail, the stimulus generator 110 may include a vibration module (not shown) for generating vibration.

According to an embodiment of the present disclosure, the vibration module may include an actuator including an elastic member, and at least one of a coin type vibration motor, an eccentric motor, and a voice coil may be used.

In addition, the actuator may be designed to be a coil type. In this case, the actuator includes a fixed permanent magnet and a vibration permanent magnet, a vibration plate, and a coil. In this case, the actuator is designed such that identical polarities of the permanent magnet at a fixed side and the permanent magnet at a vibration side face each other to maintain a state of pushing the vibration plate by applying a repulsive force to the permanent magnet at the vibration side by the permanent magnet at the fixed side before current is supplied to the coil. However, when an electrical signal, that is, current is supplied to the coil due to signal transmission, and the like, according to an operation of the wearable device 100 and a direction of the current is periodically changed, an attractive force or a repulsive force is generated between an electromagnetic field generated through a coil disposed at a central portion of the coil and a magnetic field generated from the permanent magnet at the fixed side, such that the permanent magnet at the vibration side elastically modifies the vibration plate to be moved in a vertical direction, and thus, the vibration permanent magnet vibrates.

The actuator may be designed as a piezo or polymer actuator. In this case, the actuator vibrates at a resonance frequency according to a predetermined operation mode. In this regard, the actuator may vibrate at a resonance frequency in a first operation mode and may vibrate at a driving frequency different from the resonance frequency in a second operation mode for a different operation from in the first operation mode.

The first operation mode and the second operation mode may be divided according to a required reaction velocity. The first operation mode may correspond to, for example, telephone reception and the second operation mode may correspond to, for example, character input, game playing, and the like.

That is, in the case of telephone reception, as in the first operation mode, generation of high vibration is more important than reaction velocity, and thus, the actuator may vibrate at a resonance frequency with a highest vibration power. In addition, in the case of character input, game playing, and the like, as in the second operation mode, reaction velocity is more important than vibration power, and thus, the actuator may vibrate at a driving frequency different from the resonance frequency.

The resonance frequency may refer to a unique resonance frequency of a material of the actuator and may be dependent upon the thickness of the actuator, the length of the actuator, the number of actuators, and the like.

The resonance frequency has high resonance force, but has low reaction velocity, and a driving frequency different from the resonance frequency has low resonance force but has a high reaction velocity. Here, the reaction velocity may refer to time until a reaction recognizable by a user is performed after the user applies a contact pressure.

The driving frequency may be set to be different from the resonance frequency. In this case, the driving frequency may be set as one of a frequency from 50 Hz to the resonance frequency and a frequency from the resonance frequency to 500 Hz. Here, 50 Hz is a frequency at which the user may recognize vibration and 500 Hz is a frequency at which sound together with vibration is generated. Thus, as described above, the setting of a frequency range is technically meaningful.

However, the stimulus generator 110 may be embodied in other manner except for the aforementioned vibration type of actuator. That is, the stimulus generator 110 may include any one of a touch generator, a pressure generator, an electrical stimulus generator, and a temperature stimulus generator.

The touch generator is a component that generates skin displacement stimuli-stretching, compression and pressure mechanisms to generate touch and/or generates nerve input stimuli—touch, pain, pressure, texture stimuli mechanisms to generate a touch. In addition, the touch generator may generate sub skin stimuli—epidermis, dermis, hypodermis and adipose tissue stimuli mechanisms. The pressure generator may generate a touch having a high stimulus degree. The electrical stimulus generator is a component that generates electrical stimuli—electrical muscle stimulation, electromyostimulation, electrotactile, pitch and variable pulse mechanisms to generate electrical stimulus. The temperature stimulus generator generates temperature stimuli—variable heat, chill mechanisms such that users may feel a change in body temperature.

The controller 120 controls an overall operation of the wearable device 100. In particular, the controller 120 controls the stimulus generator 110 to vary a transfer pattern of stimulus according to an operation state of the wearable device 100, which will be described in more detail.

The controller 120 includes a hardware configuration such as a Micro Processing Unit (MPU), a Central Processing Unit (CPU), a cache memory, a database, and the like, and a software configuration of an Operating System (OS) and an application for a specific purpose. According to a system clock, a control command for each component for an operation of the wearable device 100 is read, and an electrical signal is generated according to the read signal to operate each component of hardware.

According to an embodiment of the present disclosure, the wearable device 100 may be embodied as a smart watch, as described in the following embodiment of the present disclosure. However, various embodiments of the present disclosure do not preclude an embodiment of other wearable devices.

Figure 2:
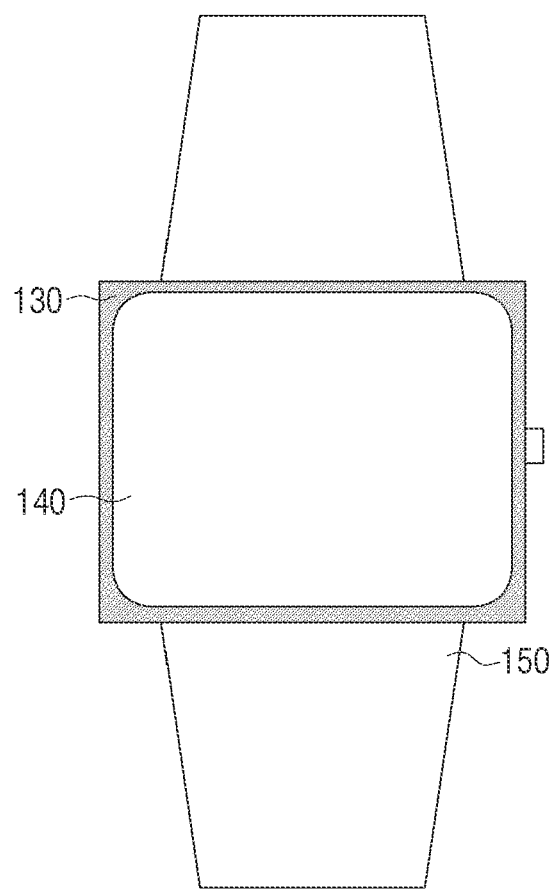
FIG. 2 is a side view of a wearable device 100-1 according to an embodiment of the present disclosure.
Figure 3:
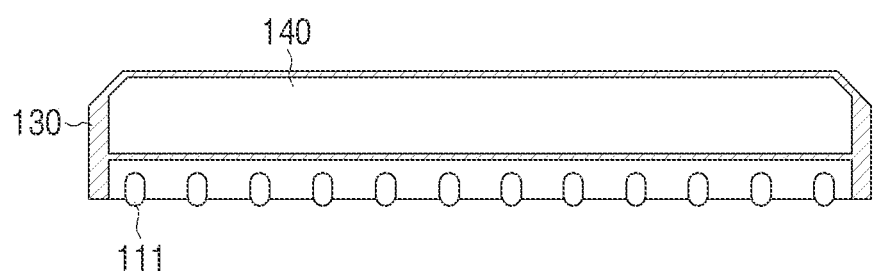
FIG. 3 is a side cross-sectional view of FIG. 2 according to an embodiment of the present disclosure.

FIG. 2 is a side view of a wearable device according to an embodiment of the present disclosure. FIG. 3 is a side cross-sectional view of the wearable device according to an embodiment of the present disclosure and is a side cross-sectional view of FIG. 2.

Referring to FIGS. 2 and 3, a wearable device 100-1 may be configured in such a way that the stimulus generator 110 and the controller 120 are surrounded by a housing 130 and a display 140 is disposed on a front surface of the housing 130. In addition, bands 150 may be connected to opposite sides of the housing 130 such that the wearable device 100-1 is wearable on the wrist.

In this case, the controller 120 may control the stimulus generator 110 according to an operation state of the wearable device 100-1 and may simultaneously control the display 140 to display information about the operation state.

For example, upon receiving a message, the controller 120 may control the stimulus generator 110 to generate a transfer pattern of stimulus corresponding to the message and may simultaneously control the display 140 to display information indicating message reception.

As illustrated in FIG. 3, actuators 111 of the stimulus generator 110 may protrude to the housing 130. Like an embodiment that will be described later, in this case, the stimulus generator 110 may include a plurality of vibration type actuators. The plural vibration type actuators may be independently controlled so as to express more complex and various pattern pieces of information.

Figure 4A:
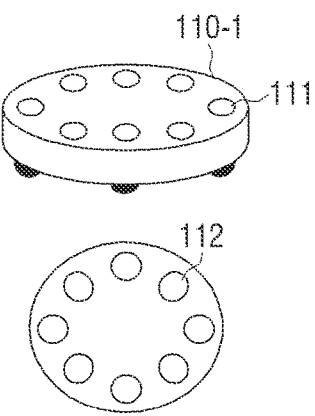
FIGS. 4A, 4B, and 4C are diagrams illustrating a mechanism of a stimulus generator according to various embodiments of the present disclosure.
Figure 4B:
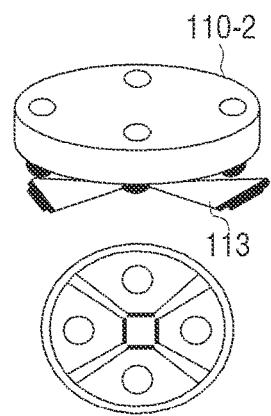
Figure 4C:
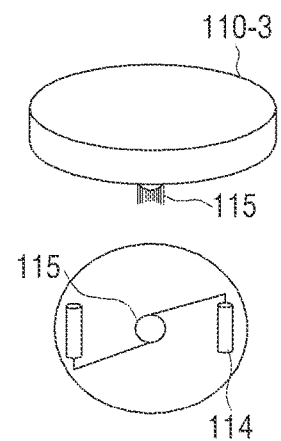

The stimulus generator 110 is not limited to the aforementioned vibration method. As described above, an electrical stimulus method, a temperature change method, a touch generation method, and a pressure method may be embodied. FIGS. 4A, 4B, and 4C illustrate this embodiment.

FIGS. 4A, 4B, and 4C are diagrams illustrating a mechanism of the stimulus generator 110 according to various embodiments of the present disclosure.

Referring to FIG. 4A, a stimulus generator 110-1 including a plurality of actuators 111 included in the wearable device 100 is illustrated. A plurality of stimulus transfers 112 is formed at a lower end portion of the wearable device 100-1. When the wearable device 100 is worn on the user's body, the plural stimulus transfers 112 contacts the user's body and a vibration stimulus is generated and is transferred to the user's body. A plurality of stimulus generators 110 may independently generate stimuli, and thus, may combine separate stimuli to transmit various messages.

Referring to FIG. 4B a stimulus generator 110-2 including a plurality of pressure actuators is illustrated. When the wearable device 100 is worn on the user's body, the wearable device 100 is spaced apart from the user's body, and thus, it is difficult to appropriately transfer a stimulus. Accordingly, as illustrated in FIG. 4B, a wing shape pressure transfer 113 may be formed at a lower end portion of the stimulus generator 110-2. The pressure transfer 113 may be moved in a vertical direction to apply a pressure to the user's body when a pressure is generated. As illustrated in FIG. 4B, when the stimulus generator 110-2 is divided into regions, pressures may be transferred to the respective regions to transfer various messages. Vibration may be transferred together with pressures and vibration transfer may be embodied.

Referring to FIG. 4C, a stimulus generator 110-3 including a bristle 115 for generating a touch stimulus is illustrated. As illustrated in FIG. 4C, the bristle 115 may be formed at a bottom surface of the stimulus generator 110-3, that is, a bottom surface of the wearable device 100. When an event occurs according to an operation state of the wearable device 100, the bristle 115 is moved by a motor 114 on the wearable device 100 and rotates at a predetermined angle to transfer a touch to the user's body. For example, upon receiving a message, the controller 120 may drive the motor 114 to move the bristle 115 and generate a movement stimulus shaped like an alphabet 'M' at a bottom surface of the stimulus generator 110-3.

In addition to the aforementioned method, various stimulus transfer technologies may be used. Any method may be used as long as patterns are distinguishable by human sense.

When the wearable device 100 is embodied as a smart watch, the stimulus generator 110 is coupled to a lower end portion of a smart watch 100 that contacts the user's body. Thus, according to an objective, various types of stimulus generators 110 may be coupled to a lower end portion of a smart watch. FIG. 5 illustrates this embodiment.

FIG. 5 is a diagram illustrating concept indicating that various types of stimulus generators are coupled to a lower end portion of a smart watch according to various embodiments of the present disclosure. Referring to FIG. 5A, an upper end portion 501 and a lower end portion 503 of the smart watch may be coupled to each other 505.

As described above, the stimulus generator 110 may further include a plurality of vibration type actuators. The controller 120 may independently control a plurality of vibration type actuators according to an operation state of the wearable device 100.

Figure 6:
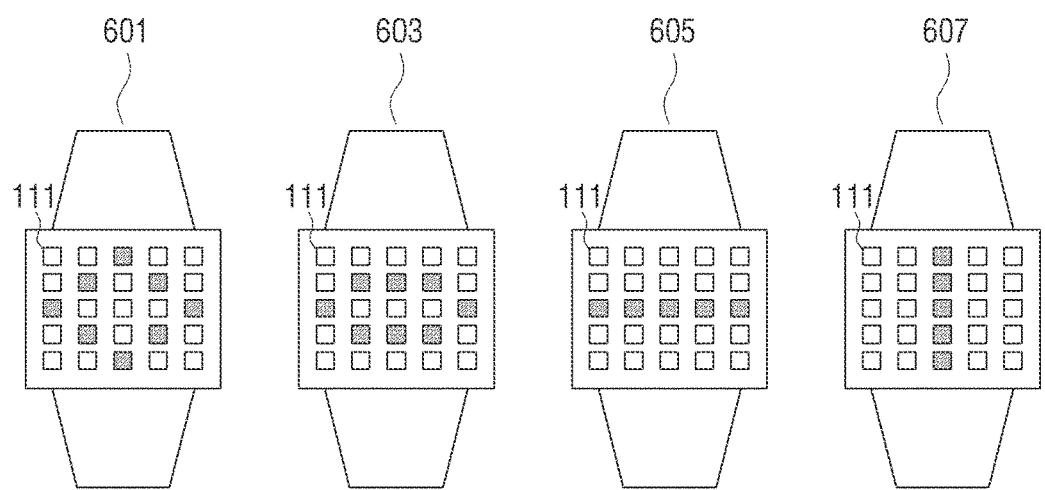
FIGS. 6 and 7 are diagrams illustrating a vibration pattern shape according to an embodiment of the present disclosure.
Figure 7:
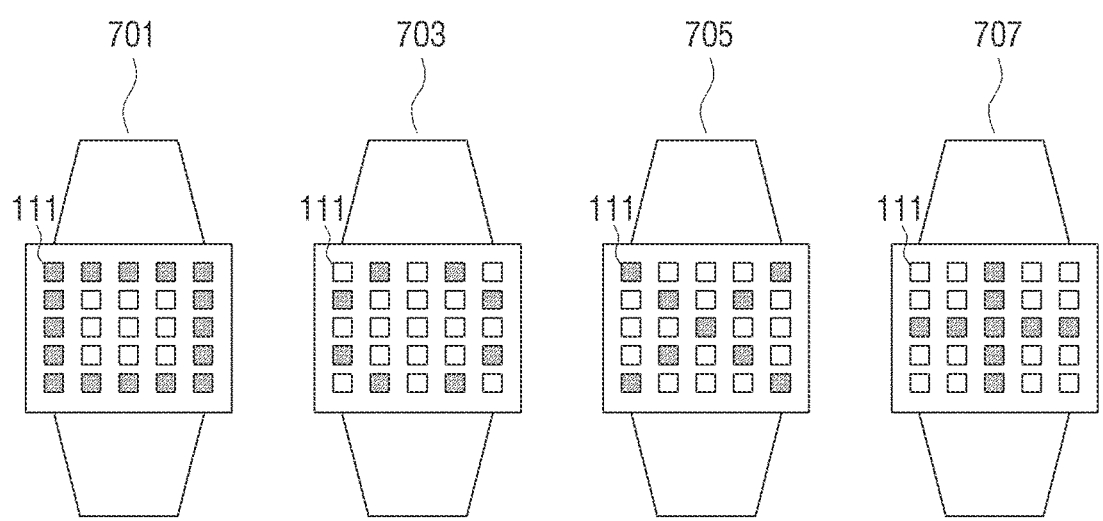

FIGS. 6 and 7 are diagrams illustrating a vibration pattern shape according to an embodiment of the present disclosure.

Referring to FIGS. 6 and 7, the controller 120 may vibrate a plurality of vibration type actuators 111 in any one form of a circle, an oval, a line, a rectangle, a dotted shape, and other shapes.

Referring to FIG. 6, a watch 601 illustrates a case in which diamond type vibration is generated, a watch 603 illustrates a case in which oval type vibration is generated, a watch 605 illustrates a case in which horizontal line type vibration is generated, and a watch 607 illustrates a case in which vertical line type vibration is generated.

Referring to FIG. 7, a watch 701 illustrates a case in which rectangular type vibration is generated, a watch 703 illustrates a case in which circular type vibration is generated, a watch 705 illustrates a case in which X type vibration is generated, and a watch 707 illustrates a case in which cross type vibration is generated.

The controller 120 may control the plural vibration type actuators 111 to sequentially vibrate to form any one shape of a circle, an oval, a line, a rectangle, a dotted shape, and other shapes.

Figure 8:
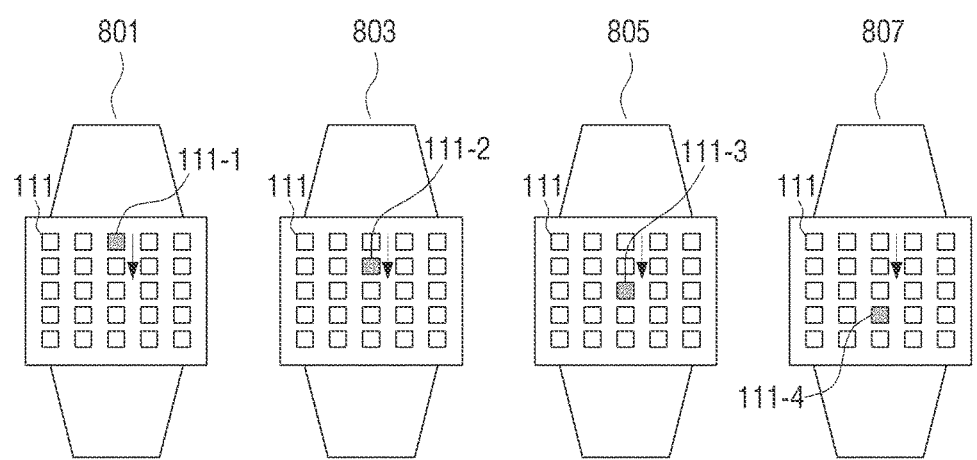
FIGS. 8, 9 and 10 are diagrams illustrating sequential vibration pattern shapes according to another embodiment of the present disclosure.
Figure 9:
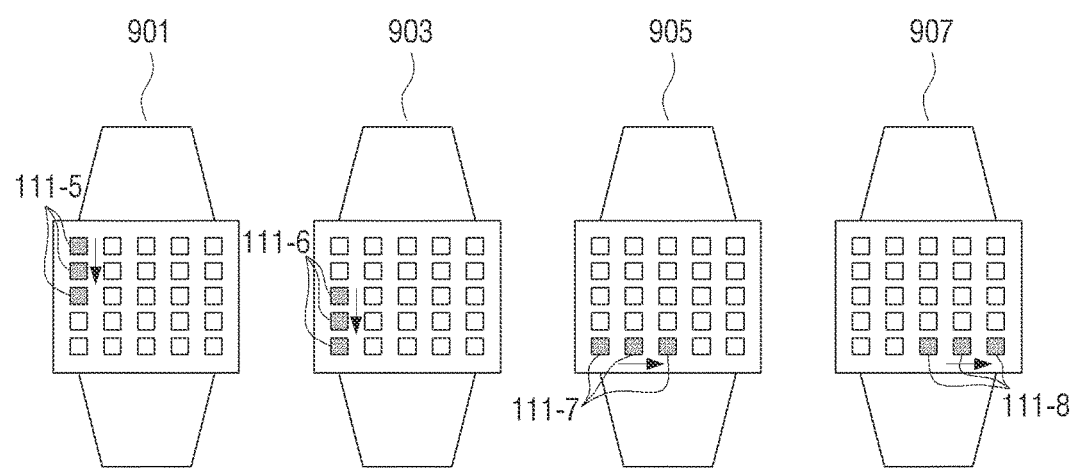
Figure 10:
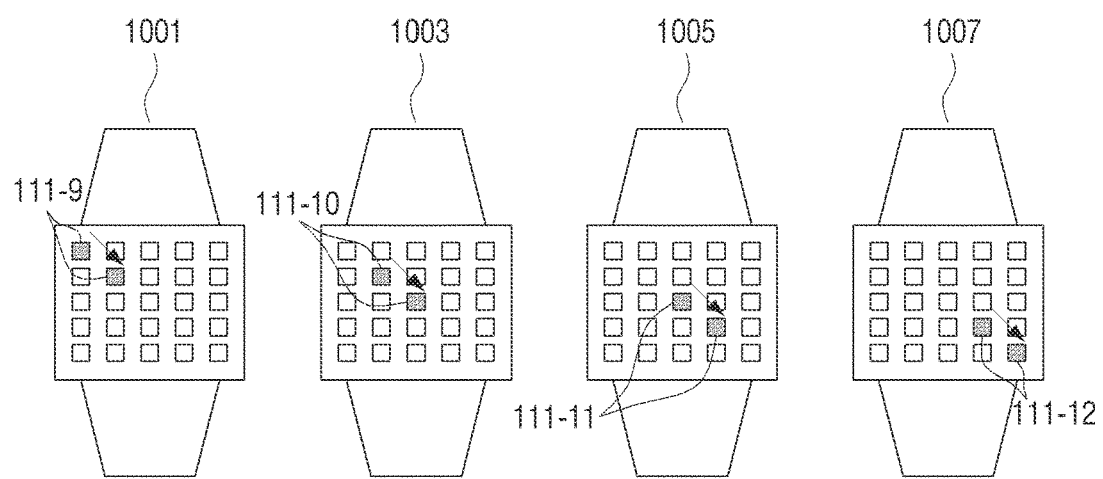

FIGS. 8 to 10 are diagrams illustrating sequential vibration pattern shapes according to another embodiment of the present disclosure.

Referring to FIG. 8, a vibration path of a case in which sequential vibration is generated along a vertical line in a downwards direction is illustrated. As illustrated in FIG. 8, first, an actuator 111-1 at an uppermost line vibrates a watch 801, an actuator 111-2 at a next line vibrates a watch 803, and then actuators 111-3 and 111-4 sequentially vibrate in a downwards direction watches 805 and 807.

Referring to FIG. 9, a vibration path of a case in which sequential vibration is generated along a rectangular pattern is illustrated. First, three actuators 111-5 at a leftmost vertical line vibrate a watch 901, the actuator 111-6 at next three lines vibrate a watch 803, three actuators 111-7 at the lowermost line vibrate a watch 805, and then the three rightmost actuators 111-8 vibrate a watch 807.

Referring to FIG. 10, a vibration path of a case in which sequential vibration is generated along a diagonal direction pattern is illustrated. First, two actuators 111-9 at the leftmost portion of the diagonal line vibrate a watch 1001, next two actuators 111-10 in a diagonal direction vibrate a watch 1003, and then the other two actuators 111-11 and 111-12 vibrate watches 1005 and 1007.

However, the aforementioned various vibration patterns are purely exemplary. Other various patterns are included in an embodiment of the present disclosure.

According to the aforementioned embodiment, a transfer pattern of stimulus is spatially varied according to an operation state of a wearable device. Alternatively, the transfer pattern may be varied temporally. That is, when a predetermined event occurs in the wearable device 100, the controller 120 may control the stimulus generator 110 to transmit patterned stimulus at a predetermined time interval.

For example, when the wearable device 100 receives call, the controller 120 may control the stimulus generator 110 to transmit a first pattern of stimulus indicating telephone reception, a second pattern of stimulus indicating the person at the other end, and a third pattern of stimulus indicating the characteristics of call at a predetermined time interval.

However, an operation of the controller 120 does not have to be performed in time sequence. That is, the first pattern of stimulus, the second pattern of stimulus, and the third pattern of stimulus may be distinguished according to themselves. For example, even if the third pattern of stimulus, the second pattern of stimulus, and the first pattern of stimulus are sequentially received in the stated order, when pattern stimuli are distinguishable according to themselves, a user may recognize an event that occurs in the wearable device 100.

Figure 11:
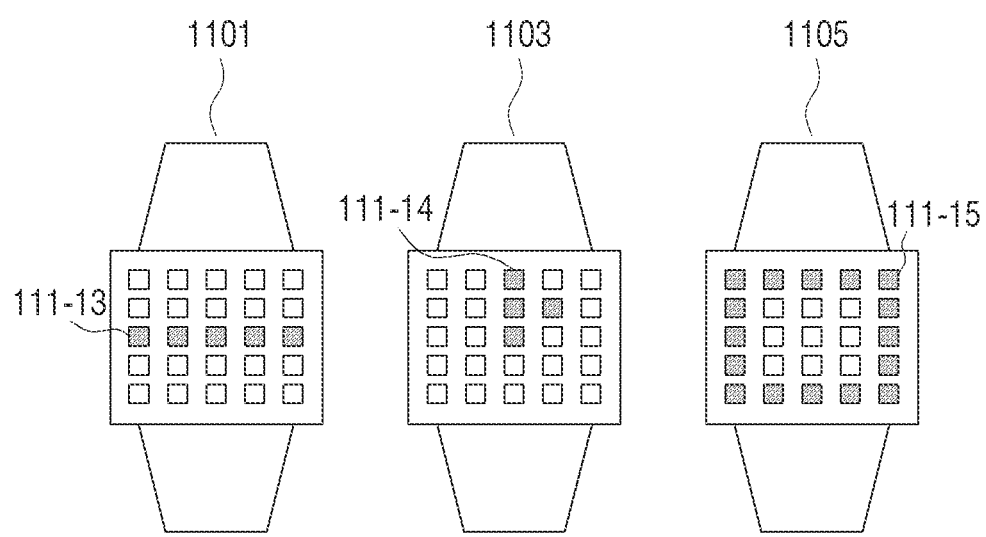
FIGS. 11 and 12 illustrate examples of multi-level indication according to an embodiment of the present disclosure.
Figure 12:
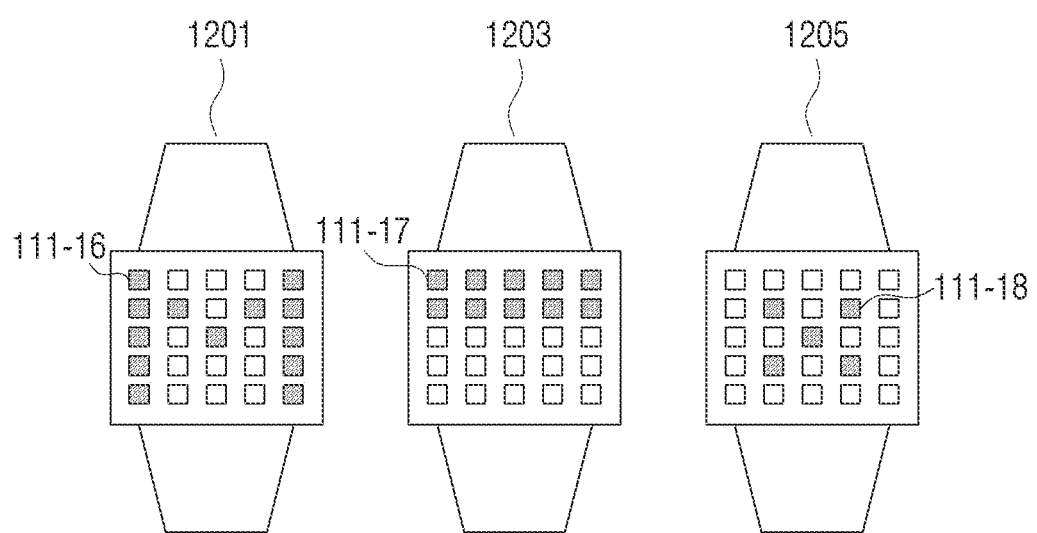

FIGS. 11 and 12 illustrate an embodiment of this case according to an embodiment of the present disclosure.

That is, FIGS. 11 and 12 illustrate an example of multi-level indication according to an embodiment of the present disclosure.

Referring to FIG. 11, a case in which the wearable device 100 receives call is illustrated. In this case, the controller 120 may control the stimulus generator 110 to transmit the first pattern of stimulus indicating telephone reception. The first pattern of stimulus indicates a horizontal-line form 111-13 as illustrated by a watch 1101. In addition, the controller 120 may control the stimulus generator 110 to transmit the second pattern of stimulus indicating the person at the other end. The person at the other end may be an abbreviated number on a telephone number list of a device such as the wearable device 100 or a smart phone connected thereto. According to an embodiment of the present disclosure, it is assumed that an abbreviated number is 1 as 'mother'. In this case, since an Arab numeral 1 needs to be indicated, an Arab numeral 1 may be indicated by '1 o'clock' of a watch. The second pattern of stimulus may be indicated as vibration of the actuator 111-14 corresponding to hour and minute hands indicating '1 o'clock', as illustrated by a watch 1103. In addition, the controller 120 may control the stimulus generator 110 to transmit the third pattern stimulus indicating the characteristics of call. It may be assumed that the characteristics of call is non-urgency when a received call number is registered as a family or a friend, and the characteristics of call is 'urgency' when the received call is income from a colleague at work or a government office. The third pattern of stimulus may be represented as the actuator 111-15 with a rectangular pattern indicating the former case, as illustrated by a watch 1105.

Referring to FIG. 12, a case in which the wearable device 100 receives a message according to an embodiment of the present disclosure is illustrated.

In this case, the controller 120 may control the stimulus generator 110 to transfer the first pattern of stimulus indicating message reception. The first pattern of stimulus may be represented as vibration of the actuator 111-16 indicating the English Alphabet 'M' referring to a message as illustrated by a watch 1201. In addition, the controller 120 may control the stimulus generator 110 to transmit the second pattern of stimulus indicating message importance. The message importance may be classified into good, fair, and poor and may be represented by locations of lines of an actuator. As illustrated by a watch 1203, the second pattern of stimulus corresponds to an important message and is represented as vibration of the actuator 111-17 at an upper line. In addition, the controller 120 may control the stimulus generator 110 to transmit the third pattern of stimulus indicating message characteristics. The message characteristics may be classified into a short message or a long message. The short message may be represented as low actuator vibration at a central portion, and the long message may be represented as actuator vibration over an entire area. According to the present embodiment, the short message may be represented as low vibration of the actuator 111-17 at the central portion as illustrated by a watch 1205. The aforementioned embodiment is purely exemplary and other different various embodiments are also included in the spirit of the present disclosure without contradiction with the spirit of the present disclosure.

Although not described, there may be various embodiments of multi-level indication. For example, a service may be provided at various levels in various indication services, for example, indication of an event, indication of an email that is not read, and the like.

Unlike in the aforementioned embodiment, the stimulus generator may be disposed on a bottom surface of a smart watch, which will be described below with regard to an embodiment of the present disclosure.

Figure 13:
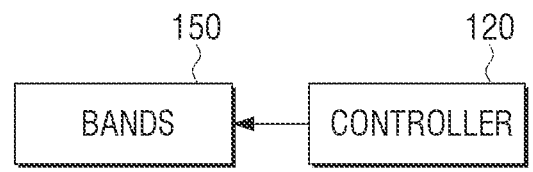
FIG. 13 is a block diagram illustrating a structure of a wearable device according to another embodiment of the present disclosure.

FIG. 13 is a block diagram illustrating a structure of a wearable device 100-4 according to another embodiment of the present disclosure.

Referring to FIG. 13, the wearable device 100-4 according to another embodiment of the present disclosure includes the controller 120 and the bands 150.

Each component has the same configuration as the aforementioned component having the same term unless otherwise described herein.

However, unlike in the aforementioned case, shapes of the bands 150 may be modified according to an operation state of the wearable device 100-4.

In addition, the controller 120 may perform control to vary shape modification of the bands 150 according to an operation state of the wearable device 100-4. Hereinafter, this principle will be described in more detail.

Figures 14A, 14B:
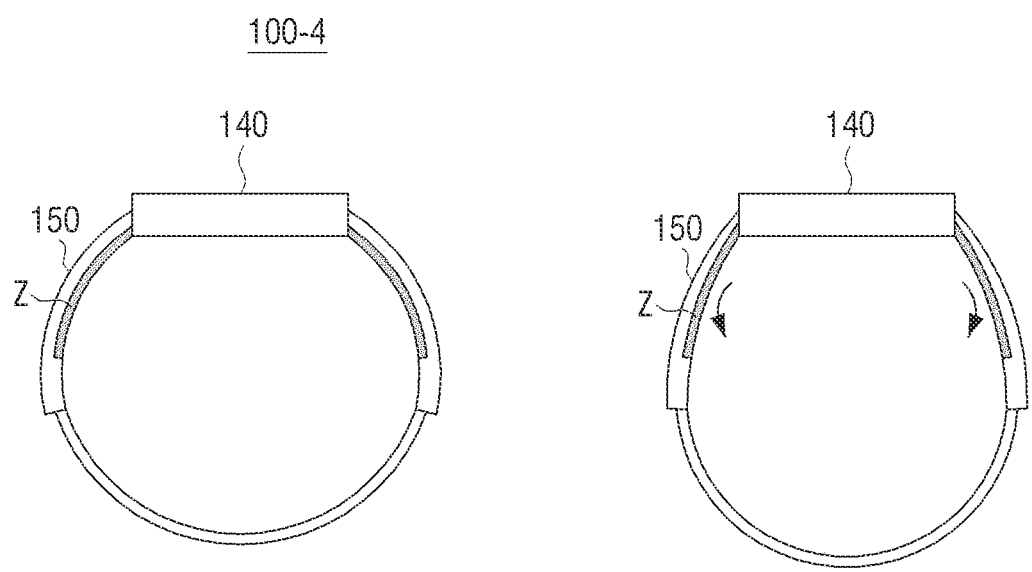
FIGS. 14A and 14B are side views of a wearable device according to another embodiment of the present disclosure.

FIGS. 14A and 14B are side views of a wearable device according to another embodiment of the present disclosure.

Referring to FIGS. 14A and 14B, the bands 150 of a wearable device 100-4 may include a piezoelectric Z using a piezoelectric effect. When an electric field is applied to the piezoelectric Z, a shape of the piezoelectric Z is modified according to the field. This is referred to as a piezoelectric effect. Shapes of the bands 150 may be modified using the piezoelectric effect.

Although not illustrated, the bands 150 may accommodate a plurality of piezoelectrics Z. In this case, the piezoelectrics Z are spaced apart from each other. The piezoelectrics Z are covered by a second protection layer (not shown). The second protection layer may be formed of rubber or plastic, or other flexible materials. A space between the piezoelectrics Z may be an empty space.

The piezoelectrics Z may be formed in various forms such as a unimorph form, a bimorph form, a stack form, and the like. The unimorph form refers to a form in which one piezoelectric layer is stacked on a metallic layer with a disk shape. The bimorph form refers to a form in which two piezoelectric layers are sequentially stacked. The stack form refers to a form in which a metallic electrode material is printed on a ceramic sheet to form a plurality sheets, the plural sheets are compressed, and an electrode is contained in the plural sheets and is sintered.

Thus, shapes of the bands 150 may be modified using the piezoelectric Z according to an operation state of the wearable device 100-4. FIG. 14A illustrates a shape of the wearable device 100-4 before the shapes of the bands 150 are modified. FIG. 14B illustrates a case in which the shapes of the bands 150 are modified according to an operation state of the wearable device 100-4. A user may detect a modified state of the bands 150 to recognize an operation state of a device.

For example, when a message is received, the wrist may be tightened by the bands 150 as illustrated in FIG. 14B. In addition, a modification pattern of the bands 150 may be varied according to a type of notice.

Shapes of the bands 150 may be independently modified from a transfer pattern of stimulus. That is, the controller 120 may independently modify the shapes of the bands 150 according to an operation state of a device to notify a user of an event.

Wearable devices 100, 100-1, 100-2, 100-3, and 100-4 may each further include a component for pressing the bands 150 to the user's body when being worn on the user's body in order to more effectively transmit a generated stimulus to the user's body. Hereinafter, the wearable device 100-5 that further includes a band adjuster will be described with regard to another embodiment of the present disclosure.

Figures 15A, 15B:
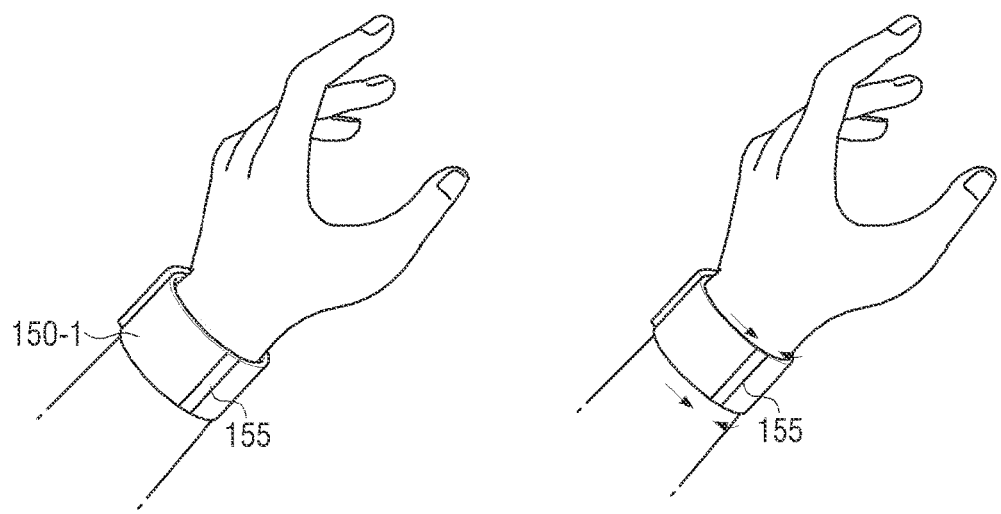
FIGS. 15A, 15B, and 16 are diagrams illustrating an operation of a wearable device according to various embodiments of the present disclosure.

FIGS. 15A and 15B are diagrams illustrating an operation of a wearable device according to another embodiment of the present disclosure.

Referring to FIGS. 15A and 15B, a wearable device 100-5 according to another embodiment of the present disclosure presses the wearable device 100-5 to a user's body in order to effectively transmit a stimulus generated by the stimulus generator 110 to the user's body. When the user wears the wearable device 100-5 on the user's body, an automatic best fit function is performed to press the wearable device 100-5 to the user's body. When connection portions of the bands 150 are artificially coupled, the user may detect that the wearable device 100-5 is worn on the user's body according to an electrical signal. When the wearable device 100-5 is worn on the user's body, the automatic best fit function may be automatically performed. Alternatively, the wearable device 100-5 may be designed to perform the best fit function according to user manipulation of pushing a specific key formed on the wearable device 100-5.

In this case, the wearable device 100-5 includes a winder 155 for automatically winding a band portion 150-1 when the wearable device 100-5 is worn on the user's body. The winder 155 drives a rotation motor included in the wearable device 100-5 to wind the band portion 150-1 into a housing of the winder 155. The rotation motor may be a DC gear head motor. The winder 155 stops the rotation motor when the band portion 150-1 is continuously wound until rotation count of the rotation motor increases and then rotation count is stopped. The housing of the winder 155 is designed to have an internal space for accommodation of the band portion 150-1. When the rotation motor is stopped, the wearable device 100-5 and the user's body are pressed to each other while tension of the bands 150 is high. Thus, when a stimulus is generated, the stimulus more effectively reaches the user's body.

When the user does not wear the wearable device 100-5 on the user's body, the band portion 150-1 is released such that the bands 150 are extended. In this case, the winder 155 may be designed to user a motor for driving in an opposite direction. In addition, wearing release may be input according to user manipulation of pressing a specific key formed on the wearable device 100-5.

As described above, an automatic best fit scheme may be embodied. Alternatively, a smart fit scheme in which a user manually wears a wearable device and a wearing state is indicated by an indicator may be embodied.

Figure 16:
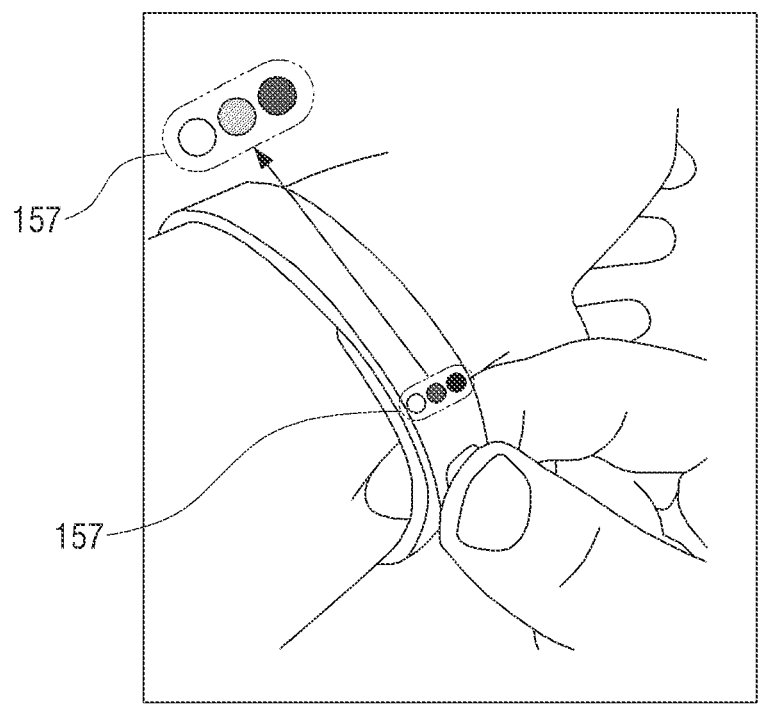

FIG. 16 is a diagram illustrating an operation of a wearable device according to an embodiment of the present disclosure.

Referring to FIG. 16, a user may directly adjust tension of the bands 150 of a wearable device 100-6 in order to effectively transfer a stimulus generated by the stimulus generator 110 to a user's body. In this case, the bands 150 include a wearing state indicator 157.

The wearing state indicator 157 determines a pressing degree between the wearable device 100-5 and a user's body based on a tension state of the bands 150, determines whether a current state is a state in which the generated stimulus is appropriately transferred to the user's body based on the pressing degree, and indicates information about the determination. As illustrated in FIG. 16, the wearing state indicator 157 may include a plurality of indicators. Each indicator may indicate a pressing state in which a generated stimulus is transferred. For example, each indicator may include a lamp. In this case, when a green color lamp is on, stimulus transfer is good, and when a red color lamp is on, it may be difficult to accurately transfer a stimulus. A user may adjust tension of the bands 150 through this information.

Hereinafter, a structure of a wearable device according to an embodiment of the present disclosure will be described in more detail.

Figure 17:
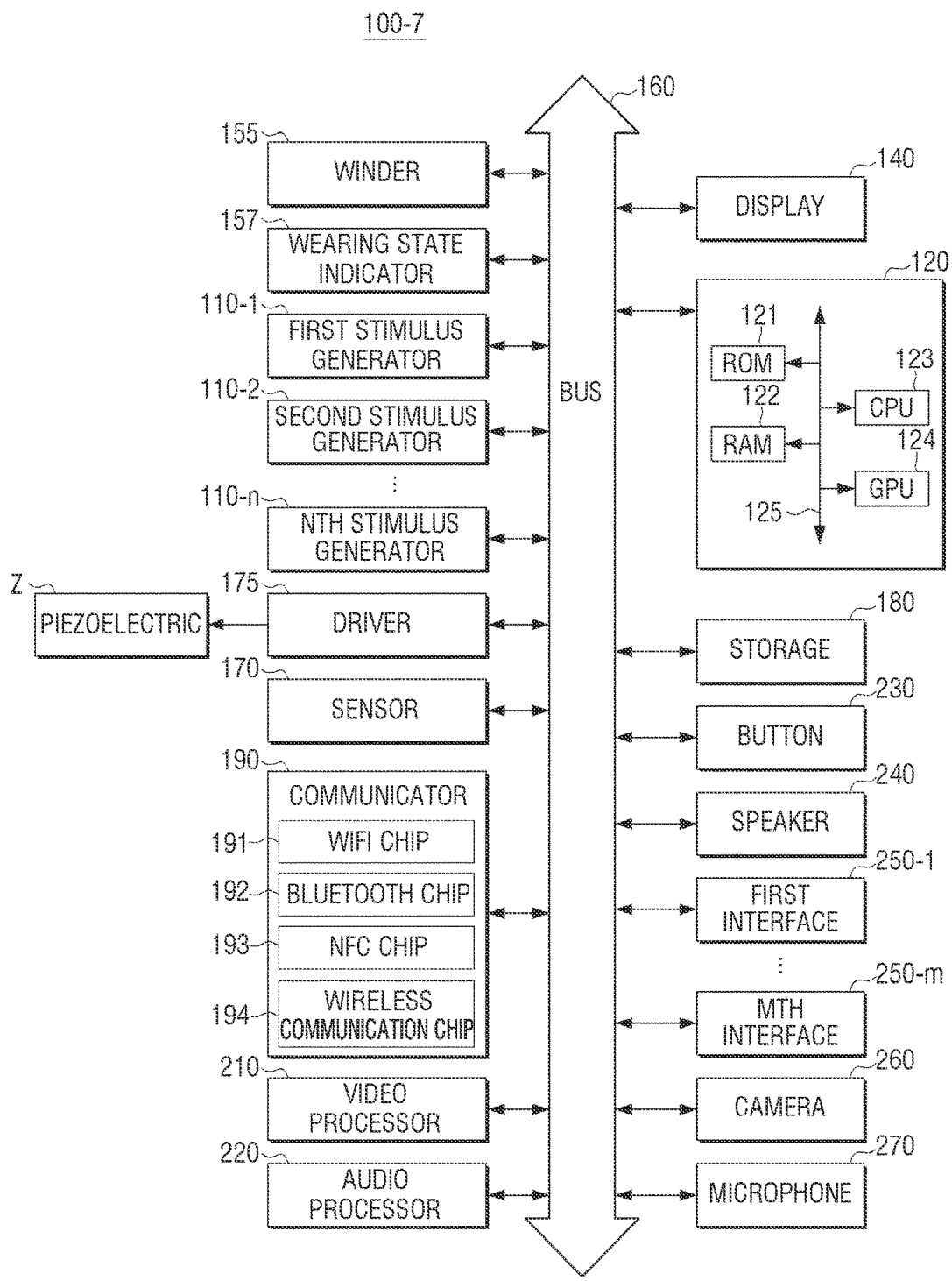
FIG. 17 is a block diagram illustrating a structure of a wearable device according to another embodiment of the present disclosure.

FIG. 17 is a block diagram illustrating a structure of a wearable device according to another embodiment of the present disclosure.

Referring to FIG. 17, a wearable device 100-7 includes a plurality of stimulus generators 110-1 to 110-n, the display 140, the controller 120, a bus 160, a sensor 170, a storage 180, a communicator 190, the housing 130, a video processor 210, an audio processor 220, a button 230, a speaker 240, interfaces 250-1 to 250-m, a camera 260, and a microphone 270, but is not limited thereto.

The aforementioned description is applied to each component except for the following description.

The sensor 170 may include a geomagnetic sensor, a gyro sensor, an acceleration sensor, a touch sensor, and the like. The geomagnetic sensor is a sensor for detection of a rotation state, a movement direction, and the like, of the wearable device 100-7. The gyro sensor is a sensor for detecting a rotation degree of the wearable device 100-7. Both the geomagnetic sensor and the gyro sensor may be used. However, even if only one of the geomagnetic sensor and the gyro sensor is included, the wearable device 100-7 may detect a rotation state. The acceleration sensor is a sensor for detection of an inclination degree of the wearable device 100-7. The touch sensor may be a capacitive touch sensor or a pressure sensitive touch sensor. The capacitive touch sensor uses a method for detecting micro electricity excited by the user's body to calculate touch coordinates when a portion of the user's body is touched on a surface of the display 140 using a dielectric substance coated on a surface of the display 140. The pressure sensitive touch sensor uses a method for detecting that current flows to calculate touch coordinates when a user touches a screen and upper and lower plates at a touched point contact each other using two electrode plates. As described above, a touch sensor may be embodied in various forms.

A transfer pattern of stimulus corresponding to an operation state of the wearable device 100-7 is stored in the storage 180. For example, the storage 180 may store a transfer pattern of stimulus that forms a stimulus with any one shape a circle, an oval, a line, a rectangle, and a dotted shape.

When a predetermined event occurs in the wearable device 100-7, the storage 180 stores a stimulus transfer pattern for transmitting a patterned stimulus at a predetermined time interval.

In addition, the storage 180 stores an operating system for execution of the present disclosure, an application for performing the aforementioned function of the controller 120, and other required program and data.

The communicator 190 is a component that communicates with various types of external devices via various types of communication methods. The communicator 190 may be embodied using various communication technologies. Mainly, the communicator 190 may include a near field communication module. In this case, the wearable device 100 may be connected to a relay device through the near field communication module to receive a service from a server on the Internet.

A wireless communication chip 194 is a chip that performs communication according to mobile communication standard such as IEEE, Zigbee, $3^{rd}$ Generation (3G), $3^{rd}$ Generation Partnership Project (3GPP), Long Term Evolution (LTE), and the like.

The communicator 190 may include a cellular communication module that is capable of transmitting and receiving data using an existing wireless telephone network. For example, a 3G mobile communication technology may be used. That is, at least one of Wideband CDMA (WCDMA), High Speed Downlink Packet Access (HSDPA), High Speed Uplink Packet Access (HSUPA), and High Speed Packet Access (HSPA).

On the other hand, a $4^{th}$ Generation (4G) mobile communication technology may be used. 2.3 GHz (portable Internet) mobile WiMAX or WiBro is Internet technology that is also available for movement at high speed.

In addition, 4G LTE technology may be applied. The LTE is an expanded technology of WCDMA and is based on Orthogonal Frequency Division Multiple Access (OFDMA) and Multiple-Input Multiple-Output (MIMO): multiple antenna technology. Since the WCDMA technology is used, it is advantageous to use an existing network.

Although WiMAX, WiFi, 3G, LTE, and the like, having a wide width and high efficiency may be used, data transmission rating is not basically high and thus more effective technologies may be used according to an embodiment of the present disclosure.

A WiFi chip 191 performs near field communication according to IEEE 802.11 technology standard. According to the IEEE 802.11 technology standard, spread spectrum type wireless communication technology called single carrier direct sequence (DSSS) and orthogonal frequency division type wireless communication technology called multi carrier Orthogonal Frequency Multiplexing (OFDM) may be used.

An NFC chip 193 operates using a Near Field Communication (NFC) using a band of 13.56 MHz among various RFID frequency bands such as 135 kHz, 13.56 MHz, 433 MHz, 860 to 960 MHz, 2.45 GHz, and the like.

When a Bluetooth chip 192 is used, various pieces of access information such as SSID, session key, and the like, are pre-transmitted and pre-received and then various pieces of information may be transmitted and received using the access information.

In addition, the wearable device 100-1 may further include a Global Positioning System (GPS) chip, a Digital Multimedia Broadcasting (DMB) reception module, and the like.

The video processor 210 is a component that processes video data. The video processor 210 may perform various image processing processes such as decoding, scaling, noise filtering, frame rate conversion, resolution conversion, and the like, on the video data.

The audio processor 220 is a component for processing audio data. The audio processor 220 may perform various processing processes such as decoding, amplification, noise filtering, and the like, on the audio data.

The audio processor 220 and the video processor 210 may be used to process and reproduce multimedia content, DMB broadcast signals, and the like.

The display 140 displays a video frame processed by the video processor 210. The speaker 240 is a component that outputs various indication messages, voice messages, and the like, as well as various audio data processed by the audio processor 220.

The display 140 may include a display panel (not shown). The display panel may be embodiment as a Liquid Crystal Display (LCD), an Organic Light Emitting Diode (OLED), an Electrophoretic Display (EPD), an Electrochromic Display (ECD), a Plasma Display Panel (PDP), and the like. When the display 140 is embodied as an LCD, a backlight unit (not shown) is required. With regard to the backlight unit, a direct type backlight or edge type back light such as a lamp, a Light Emitting Diode (LED), and the like, is disposed to provide backlight toward the display panel.

A panel driver (not shown) drives the display panel. The panel driver applies a driving voltage to a plurality of pixels constituting the display panel. The panel driver may be embodied as an a-Si Thin Film Transistor (TFT), a Low Temperature Poly Silicon (LTPS) TFT, an Organic TFT (OTFT), and the like. The panel driver may be embodied in various forms according to a type of the display panel. For example, the display panel may include an organic luminous user's body including a plurality of pixel cells and an electrode layer that covers the organic luminous user's body. In this case, the panel driver may include a plurality of transistors corresponding to respective cells of the display panel. When an electrical signal is applied to each transistor, the transistor allows a pixel cell connected thereto to emit light. Thus, an image may be displayed on the display panel. In addition, a color filter may be further included.

In addition, the display 140 may be embodied as e-paper. The e-paper may use a method using a semi-spherical type twist ball charged with electric charges, an electrophoretic display method and a microphone capsule, a display method using cholesterol liquid crystal, and the like.

The display 140 may include a substrate (not shown) for supporting components. The substrate may be a plastic substrate formed of various materials such as PolyImide (PI), PolyCarbonite (PC), PolyEthyleneTerephtalate (PET), PolyEtherSulfone (PES), PolythylEneNaphthalate (PEN), Fiber Reinforced Plastic (FRP), and the like.

The button 230 may be various types of buttons such as a mechanical button, a touch pad, a wheel, and the like, formed on a random region of a front portion, a lateral surface portion, a bottom surface portion, and the like, of the wearable device 100-1.

The camera 260 is a component for capturing a still image or a moving picture according to control of a user. The camera 260 may be embodied as a plurality of cameras such as a front camera or a rear camera.

The microphone 270 is a component for receiving user voice or other sounds and converting the received voice or sounds into audio data. The controller 120 may use user voice input via the microphone 270 or convert the user voice into audio data and store the audio data in the storage 180.

When the camera 260 and the microphone 270 are provided, the controller 120 may perform a control operation according to the user voice input through the microphone 270 or a user motion recognized by the camera 260. That is, the wearable device 100-7 may operate in a motion control mode or a voice control mode as well as according to a touch or button input. When the wearable device 100-7 operates in the motion control mode, the controller 120 activates the camera 260 to photograph a user and tracks a motion change of the user to perform a control operation corresponding to the motion change. When the wearable device 100-7 operates in the voice control mode, the controller 120 may analyze the user voice input through the microphone 270 and may operate in a voice recognition mode in which a control operation is performed according to the analyzed user voice. The controller 120 may drive each of the stimulus generators 110-1 to 110-n based on the user voice or motion, manipulation of the button 230, and the like.

In addition, the controller 120 may further include various interfaces 250-1 to 250-m for connection with various external terminals such as a headset, a mouse, a LAN, and the like. In addition, although not illustrated, the wearable device 100-1 may further include a power source (not shown). The power source is a component for supplying power to the components of the wearable device 100-4.

The aforementioned operation of the controller 120 may be performed according to a program stored in the storage 180. Various data such as Operating System (O/S) for driving the wearable device 100-7, various applications, various data that are input or set during execution of application, content gestures, driving information of stimulus generator, and the like, may be stored in the storage 180.

The controller 120 may control an overall operation of the wearable device 100-4 using various programs stored in the storage 180.

The controller 120 includes a Read Only Memory (ROM) 121, a Random Access Memory (RAM) 122, a CPU 123, a Graphic Processing Unit (GPU) 124, and a system bus 125.

The ROM 121, the RAM 122, the CPU 123, and the GPU 124 may be connected to each other through the system bus 125.

The CPU 123 accesses the storage 180 to boot using the O/S stored in the storage 180. In addition, various operations may be performed using the various programs, the data, and the like, stored in the storage 180.

A command set, and the like, for system booting are stored in the ROM 121. When a turn-on command is input to supply power, the CPU 123 copies the O/S stored in the storage 180 to the RAM 122 according to the command stored in the ROM 121 and executes the O/S to boot a system. Upon completing booting, the CPU 123 copies the various application programs stored in the storage 180 to the RAM 122 and executes the application program copied to the RAM 122 to perform various operations.

In particular, the CPU 123 copies application programs required for an operation of the wearable device 100-7 to the RAM 122 to enter a standby state. When an even occurs, for example, when an email or a message is received or call is received, the application determines a transfer pattern of stimulus according to an operation state of the wearable device 100-7. The transfer pattern of the stimulus includes address information, direction information, and driving signal information of the stimulus generators 110-1 to 110-n. The application generates a driving signal according to the determined stimulus pattern of the stimulus, generates a driving signal to be applied to the stimulus generators 110-1 to 110-n, and requests the O/S for an operation of the stimulus generator. The O/S operates the stimulus generator 110 via a handler.

The GPU 124 generates an image containing various objects such as an icon, an image, a text, and the like, using a calculator (not shown) and a render (not shown). The calculator calculates an attribute value such as a coordinate value, a shape, a size, a color, and the like, for displaying each object according to a layout of an image. The render generates various layouts including an object based on the attribute value calculated by the calculator. The image generated by the render is displayed on a display region of the display 140.

The calculator calculates information according to an operation state of the wearable device 100-7 and the render transmits the calculated information to a display panel according to a frame rate. The stimulus generated by the wearable device 100-7 is transmitted through tactile sensation, and thus, visual information needs to be transmitted in order to accurately transmit information.

In particular, transmission of the visual information is helpful for the case of multi-level indication. Referring to FIG. 11B, vibration of the actuator 111-2 corresponding to hour and minute hands represent that the person at the other end is a 'mother' stored as #1. However, when the user does not remember that #1 is a 'mother', this method is not effective. In this case, it is required to display information about the person at the other end, who currently makes a call, through a display.

When the wearable device 100-7 further include the piezoelectric Z in the bands 150, the piezoelectric Z is connected to a driver 175. The driver 175 applies a driving input for converting an electrical signal according to a control input from the controller 120 to the piezoelectric Z. The piezoelectric Z is modified according to the input electrical signal. According to the modification of the piezoelectric Z, shapes of the bands 150 are changed.

Figure 18:
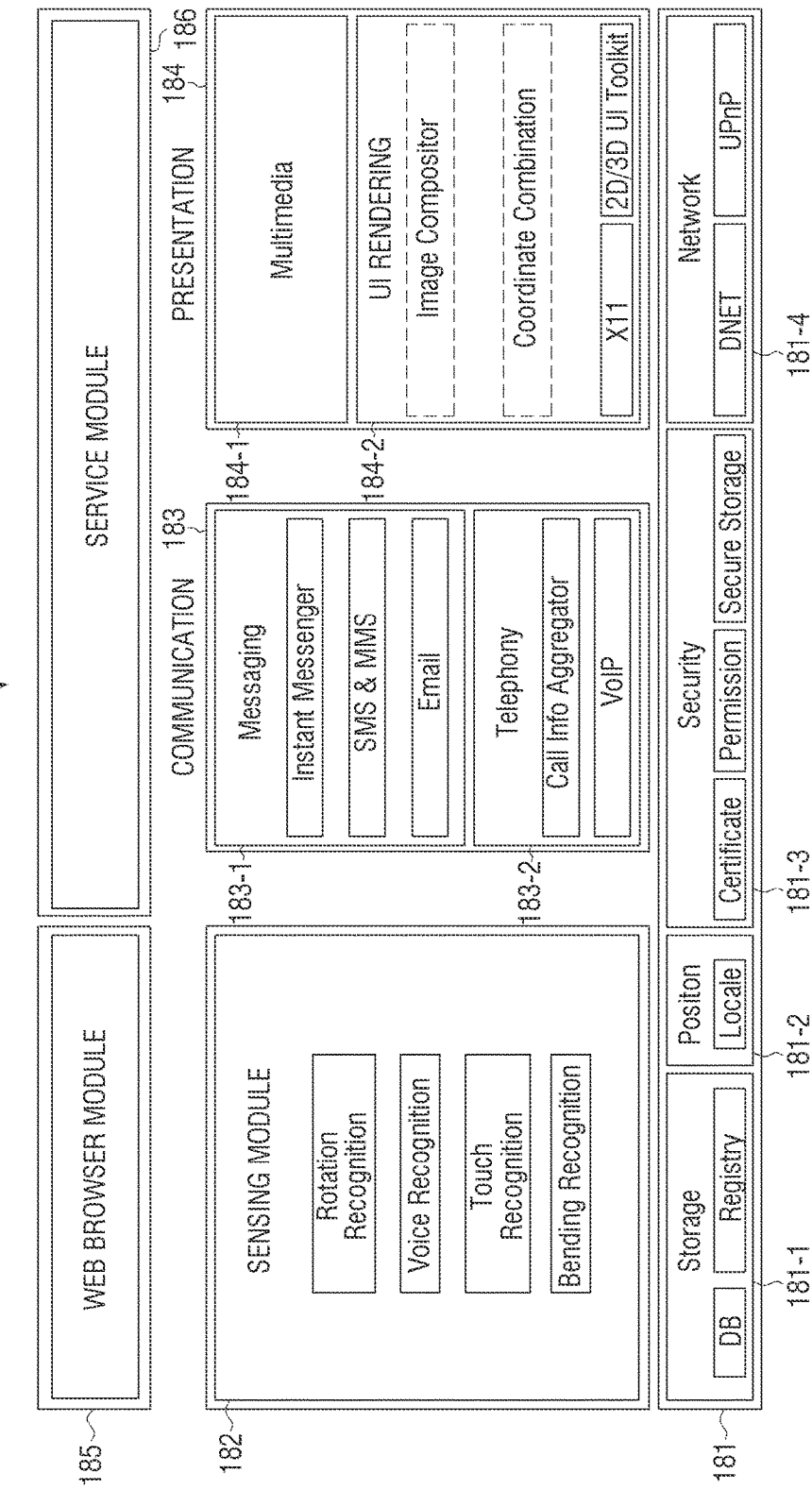
FIG. 18 is a diagram for explanation of a structure of software stored in a storage according to an embodiment of the present disclosure.

FIG. 18 is a diagram for explanation of a structure of software stored in a storage according to an embodiment of the present disclosure.

Referring to FIG. 18, software including a base module 181, a sensing module 182, a communication module 183, a presentation module 184, a web browser module 185, and a service module 186 may be stored in the storage 180

The base module 181 is a basic module that processes signals transmitted from each hardware included in the wearable device 100 and transmits the signals to a higher layer module.

The base module 181 includes a storage module 181-1, a positioning based module 181-2, a security module 181-3, a network module 181-4, and the like.

The storage module 181-1 is a program module that manages a DataBase (DB) and/or a register. The CPU 123 may access a database in the storage 180 using the storage module 181-1 to read various data. The positioning based module 181-2 is a program module for supporting a positioning based service in conjunction with various hardware components, such as a GPS chip, and the like. The security module 181-3 is a program module for supporting certification for hardware, request permission, secure storage, and the like, and the network module 181-4 is a module for supporting network connection and includes a DNET module, an UPnP module, and the like.

The sensing module 182 is a module that collects information from various sensors included in the sensor 170 and analyzes and manages the collected information. In detail, the sensing module 182 is a program module for detecting manipulation attributes such as a coordinate value of a touch point, a touch movement direction, movement velocity, movement distance, and the like. In addition, as necessary, the sensing module 182 may include a rotation recognition module, a voice recognition module, a touch recognition module, a motion recognition module, a bending recognition module, and the like. As described above, the bending recognition module is software that analyzes a detection signal of the sensor 170 and determines a modification state.

The communication module 183 is a module that communicates with an external device. The communication module 183 may include a messaging module 183-1 such as a messenger program, a Short Message Service (SMS) & Multimedia Message Service (MMS) program, an email program, and the like, and a telephone module 183-2 including a call info aggregator program module, a VoIP module, and the like.

The presentation module 184 is a module for configuration of a display image. The presentation module 184 includes a multimedia module 184-1 for reproducing and outputting multimedia content, and a UI rendering module 184-2 for performing UI and graphic processing. The multimedia module 184-1 may include a player module, a camcorder module, a sound processing module, and the like. Thus, the multimedia module 184-1 may reproduce various multimedia contents and generate and reproduce an image and sounds. The UI rendering module 184-2 may include an image compositor module for combining images, a coordinate combination module for combining and generating coordinates on a screen on which an image is to be displayed, an X11 module for receiving various events from hardware, a 2D/3D UI toolkit for providing a tool for configuration of a 2D or 3D form UI, and the like.

The web browser module 185 refers to a module that performs web browsing to access a web server. The web browser module 185 may include various modules such as a web view module for configuration of a web page, a download agent module for download, a bookmark module, a webkit module, and the like.

The service module 186 is a module including various applications for providing services that match manipulation information when various user manipulations such as modification, user voice, motion, touch, button manipulation, and the like, are performed. For example, the service module 186 may include a word program, an e-book program, a calendar program, a game program, a schedule management program, an indication management program, a content reproduction program, a navigation program, a widget program, and the like.

Hereinafter, a method for providing a message of a wearable device according to various embodiments of the present disclosure will be described.

FIGS. 19 to 22 are flowcharts of a method for providing a message of a wearable device according to various embodiments of the present disclosure.

Figure 19:
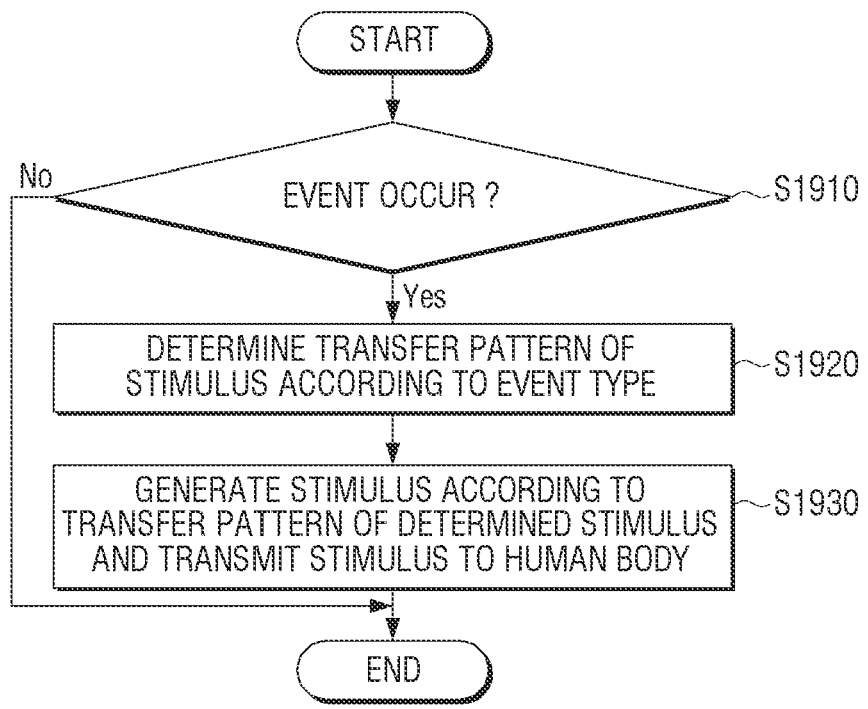
FIGS. 19, 20, 21, and 22 are flowcharts of a method for providing a message of a wearable device according to various embodiments of the present disclosure.

Referring to FIG. 19, in the method for providing a message of a wearable device according to an embodiment of the present disclosure, when an event occurs in operation S1910, a transfer pattern of stimulus is determined according to a type of the event in operation S1920. In addition, a stimulus is generated according to the determined transfer pattern of the stimulus and is transmitted to a user's body in operation S1930.

In this case, operation S1930 of generating the stimulus and transmitting the stimulus to the user's body may be performed by at least one vibration type actuator.

In operation S1930 of generating the stimulus and transmitting the stimulus to the user's body, a plurality of vibration type actuators may sequentially vibrate to form any one form of a circle, an oval, a line, a rectangle, and a dotted shape.

In operation S1930 of generating the stimulus and transmitting the stimulus to the user's body, patterned stimulus at a predetermined time interval may be transmitted according to the determined transfer pattern of stimulus.

Figure 20:
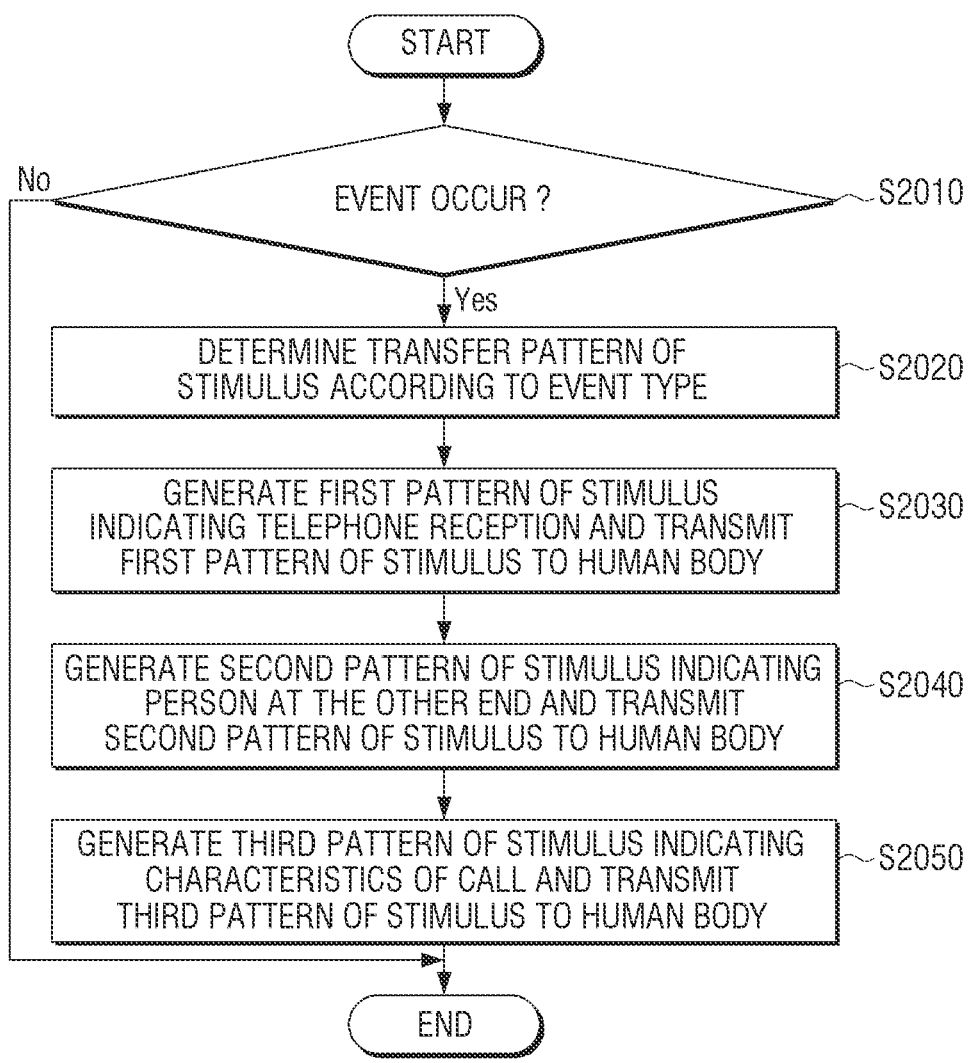

Referring to FIG. 20, in the method for providing a message of a wearable device according to another embodiment of the present disclosure, when an even of telephone reception occurs in operation S2010, a transfer pattern of stimulus is determined according to an event type in operation S2020. In this case, a first pattern of stimulus indicating telephone reception, a second pattern of stimulus indicating the person at the other end, and a third pattern of stimulus indicating the characteristics of call may be transmitted in operations S2030, S2040, and S2050.

Figure 21:
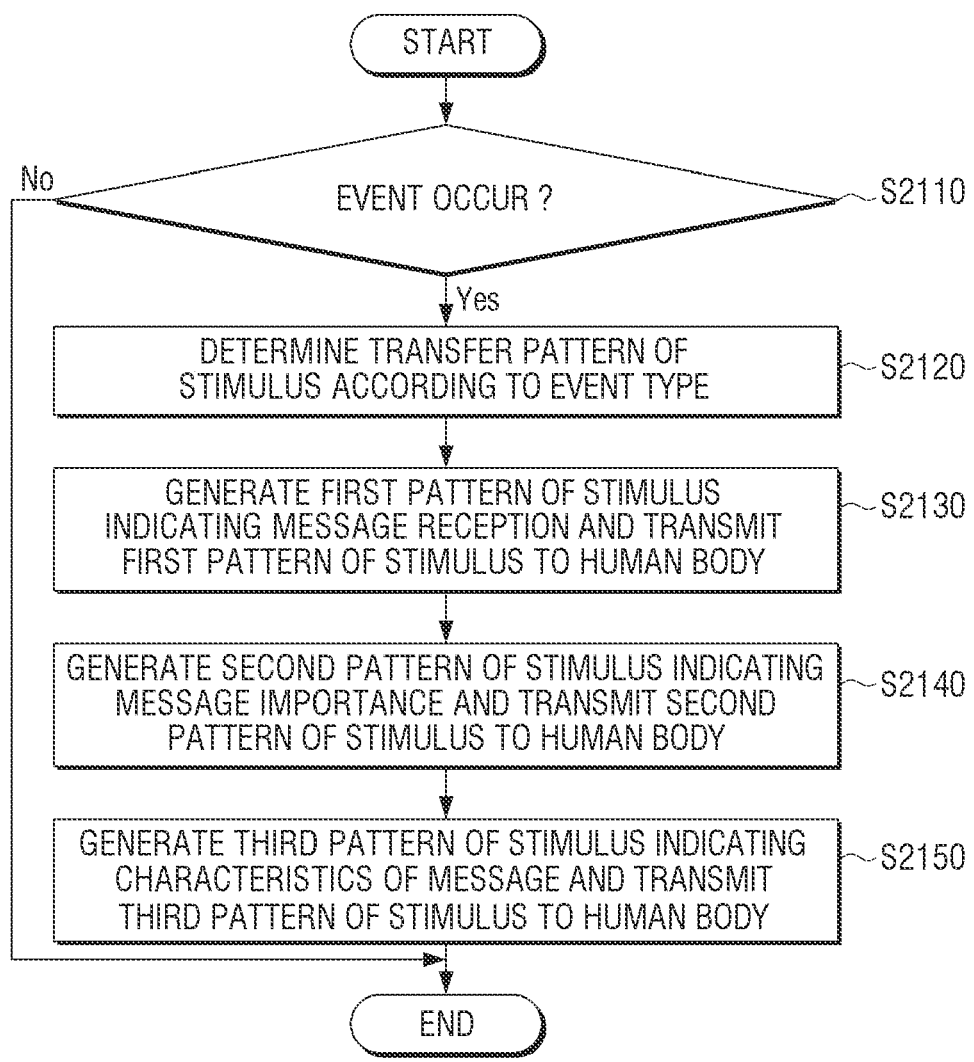

Referring to FIG. 21, in the method for providing a message of a wearable device according to another embodiment of the present disclosure, when an event of message reception occurs in operation S2110, a transfer pattern of stimulus is determined according to a type of the event in operation S2120. In this case, a first pattern of stimulus indicating message reception, a second pattern of stimulus indicating message importance, and a third pattern of stimulus indicating message characteristics may be transmitted to the user's body in operations S2130, S2140, and S2150.

In addition, the method of providing a message of a wearable device may further include operation of displaying information about an operation of the wearable device.

Operation of generating the stimulus and transmitting the stimulus to the user's body may be performed by any one of a pressure generator, an electrical stimulus generator, a touch generator, and a temperature stimulus generator.

According to the aforementioned various embodiments of the present disclosure, a stimulus is given according to an operation state of a wearable device to indicate the operation state of the wearable device to release user's sight or auditory from the device.

An embodiment of the present disclosure provides a wearable device that generates various types of stimuli to transfer various indication messages to the user.

In addition, a multi-level pattern stimulus may be generated to transmit a multi-level indication message about the wearable device to the user.

Figure 22:
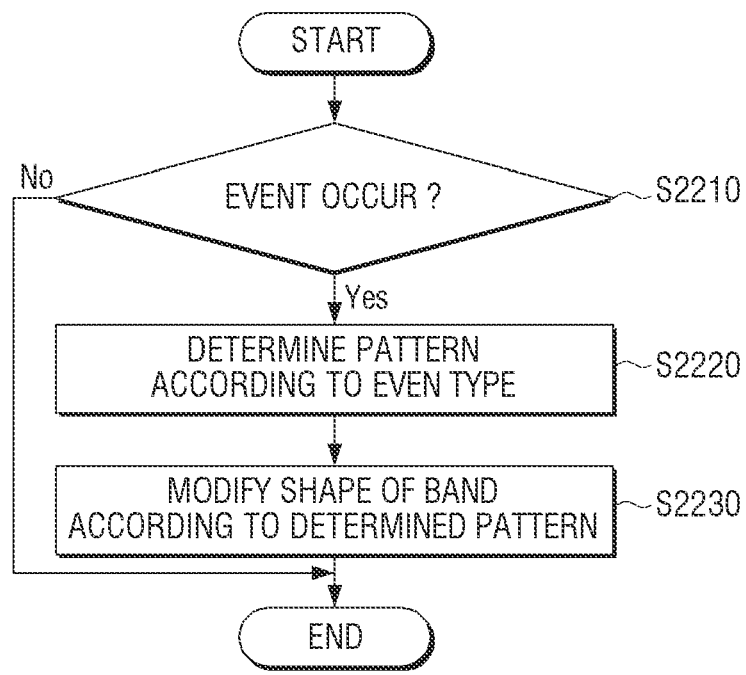

Referring to FIG. 22, in the method for providing a message of a wearable device according to an embodiment of the present disclosure, when an event occurs in operation S2210, a transfer is determined according to a type of the event in operation S2220. In addition, shapes of bands are modified according the determined pattern in operation S2230.

In this case, when the event occurs, the bands are tightened.

In addition, a generator for generating various patterns of stimuli of the wearable device is not limited and may include various examples.

According to the aforementioned various embodiments of the present disclosure, a stimulus is given according to an operation state of a wearable device to indicate the operation state of the wearable device to release user's sight or auditory from the device.

Various embodiments of the present disclosure provide a wearable device and a method for providing a message of a wearable device, in which the wearable device generates various types of stimuli to transfer various indication messages to the user.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A wearable device comprising:
   a band configured to fasten the wearable device to a user's body;
   a stimulus generator configured to generate a stimulus; and
   at least one processor configured to:
   in response to receiving a communication event, control the band to be tightened to transfer the stimulus related to the event to the user's body,
   determine first information indicating a type of the communication event,
   determine second information indicating a characteristic of the communication event,
   determine the stimulus including a first pattern based on the first information and a second pattern based on the second information, and
   control the stimulus generator to generate the stimulus to the user's body using the first pattern and the second pattern,
   wherein the first pattern is different from the second pattern, and
   wherein the first pattern and the second pattern are sequentially generated.

2. The wearable device as claimed in claim 1, wherein the stimulus generator comprises at least one vibration type actuator.

3. The wearable device as claimed in claim 1,
   wherein the stimulus generator further comprises a plurality of vibration type actuators, and
   wherein the at least one processor is further configured to independently control the plural vibration type actuators according to an operation state of the wearable device.

4. The wearable device as claimed in claim 3, wherein the at least one processor is further configured to sequentially vibrate the plural vibration actuators to form any one of a circle, an oval, a line, a rectangle, and a dotted shape.

5. The wearable device as claimed in claim 3, further comprising a display,
   wherein the at least one processor is further configured to control the display to display information according to the operation state of the wearable device.

6. The wearable device as claimed in claim 1, wherein the at least one processor is further configured to control the stimulus generator to generate a patterned stimulus at a predetermined time interval when a predetermined event occurs in the wearable device.

7. The wearable device as claimed in claim 1, wherein the at least one processor is further configured to control the stimulus generator to generate a person at another end when the wearable device receives the communication event.

8. The wearable device as claimed in claim 1, wherein the at least one processor is further configured to control the stimulus generator to generate a third pattern of stimulus indicating message importance when the wearable device receives the communication event.

9. The wearable device as claimed in claim 1, wherein the stimulus generator is disposed on a surface of the wearable device, which contacts the user's body.

10. The wearable device as claimed in claim 1, wherein the wearable device communicates with at least one external terminal.

11. The wearable device as claimed in claim 1, wherein the wearable device is a smart watch.

12. The wearable device as claimed in claim 1, wherein the stimulus generator comprises any one of a pressure generator, an electrical stimulus generator, a touch generator, and a temperature stimulus generator.

13. The wearable device as claimed in claim 1, further comprising:
    a winder configured to wind a portion of the band when the wearable device is worn on the user's body.

14. The wearable device as claimed in claim 13,
    wherein the winder comprises a rotation motor, and
    wherein the at least one processor is further configured to control the winder to stop the rotation motor when a portion of the band is wound for a rotation count.

15. The wearable device as claimed in claim 1, further comprising:
    a wearing state display configured to display an operation state of the band.

16. The wearable device as claimed in claim 15, wherein the operation state display comprises a plurality of lamps.

17. A method for providing a message of a wearable device, the method comprising:
    in response to receiving a communication event, controlling a band to be tightened to fit to a user's body;
    determining first information indicating a type of the communication event;
    determining second information indicating a characteristic of the communication event;

determining a stimulus including a first pattern based on the first information and a second pattern based on the second information;

generating the stimulus including the first pattern associated with the first information and the second pattern associated with the second information; and transmitting the stimulus to the user's body, wherein the wearable device is fastened to the user via the band, wherein the first pattern is different from the second pattern, and wherein the first pattern and the second pattern are sequentially generated.

18. The method as claimed in claim 17, wherein the generating of the stimulus is performed by at least one vibration type of actuator.

* * * * *